United States Patent [19]
Ozcelik et al.

[11] Patent Number: 6,041,400
[45] Date of Patent: Mar. 21, 2000

[54] DISTRIBUTED EXTENSIBLE PROCESSING ARCHITECTURE FOR DIGITAL SIGNAL PROCESSING APPLICATIONS

[75] Inventors: Taner Ozcelik, Palo Alto; Shirish Gadre; Yew-Koon Tan, both of San Jose, all of Calif.

[73] Assignees: Sony Corporation, Tokyo, Japan; Sony Electronics Inc., Park Ridge, N.J.

[21] Appl. No.: 09/179,147

[22] Filed: Oct. 26, 1998

[51] Int. Cl.[7] .................................................. G06F 19/00
[52] U.S. Cl. .............................. 712/35; 712/20; 712/21; 712/22
[58] Field of Search ................................. 712/35, 20, 21, 712/22; 348/571

[56] References Cited

U.S. PATENT DOCUMENTS

| | | | |
|---|---|---|---|
| 5,742,840 | 4/1998 | Hansen et al. | 712/210 |
| 5,870,310 | 2/1999 | Malladi | 895/500.2 |
| 5,959,689 | 9/1999 | De Lange et al. | 348/571 |

OTHER PUBLICATIONS

Egura et al., "An 800 MOPS 110 mW 1.5 V Parallel DSP for Mobile Multimedia Processing", *1998 IEEE International Solid–State Circuits Conference*, pp. 292–293.

Crinon, Regis I., "ATSC Data Broadcast Services: Protocols, Application Signaling, Buffer Models, Profiles, and Levels", *ICCE., International Conference on Consumer Electronics*, IEEE, pp. 4–5, Jun. 22–24 1999.

Ibrahim et al., "An Enhanced DSP Architecture for the Seven Multimedia Functions: the Mpact 2 Processor", *IEEE Workshop on Signal Processing Systems*, 1997 SIPS97—Design and Implementation, pp. 76–85, Nov. 3–5,1997.

Muroda et al., "Multimedia Processors," *Proceedings of the IEEE*, vol. 86, iss. 6, pp. 1203–1221, Jun. 1998.

*Primary Examiner*—William M. Treat
*Attorney, Agent, or Firm*—Wood,Herron&Evans,L.L.P.

[57] ABSTRACT

A circuit arrangement and method utilize a distributed extensible processing architecture to allocate various DSP functions or operations between multiple processing cores disposed on an integrated circuit device. Each processing core includes one or more hardwired datapaths to provide one or more DSP operations. Moreover, each processing core includes a programmable controller that controls the operation of each hardwired datapath via a local computer program executed by the controller. Furthermore, the processing cores are coupled to one another over a communications bus to permit data to be passed between the cores and thereby permit multiple DSP operations to be performed on data supplied to the device.

40 Claims, 5 Drawing Sheets

DISTRIBUTED EXTENSIBLE PROCESSING ARCHITECTURE FOR DIGITAL SIGNAL PROCESSING APPLICATIONS

FIELD OF THE INVENTION

The invention is generally related to integrated circuit device architecture, and more particularly, to an integrated circuit device architecture for use in digital signal processing applications.

BACKGROUND OF THE INVENTION

Future generations of audio/video processing circuitry will continue to have to break new ground in performance to satisfy consumers' desires for greater functionality and higher audio/video quality in consumer electronic devices such as computers, televisions, direct broadcast satellite (DBS) receivers, audio/video (A/V) receivers, digital versatile disc (DVD) players, cable set-top boxes, etc. (referred to hereinafter as A/V components). In particular, emerging standards such as the Advanced Television Systems Committee (ATSC) digital television specification, the MPEG-2 video decoding specification, the Dolby AC3 audio decoding specification, etc., have significantly raised the performance requirements for the hardware circuitry used in such devices.

Decoding is a process of retrieving information from a data stream and formatting the data in a useable form. Decoding is a form of digital signal processing (DSP), and is typically handled by dedicated DSP circuitry in an integrated circuit device, or "chip." A number of other DSP functions or operations may be used in A/V components, e.g., filtering, demultiplexing, close captioning decoding, graphics overlaying, etc.

At one time, separate DSP chips were used in a given design to implement the various digital signal processing tasks, or operations, required in an A/V component. The DSP chips were mounted on a circuit board with a main programmable controller such as a microprocessor, with electrical connections provided between the various chips to permit data to be transmitted therebetween.

However, as the performance requirements of such components have grown, and as chip manufacturing techniques have improved, a significant need has developed for a manner of integrating the functionality of multiple DSP chips onto the same integrated circuit device. The benefits of integrating multiple functions onto the same chip often include greater performance, lower design and manufacturing costs, reduced component size, and reduced power requirements, among others.

Two primary integration approaches are often used to implement multiple DSP functions on a given integrated circuit device. A first approach is a completely hardwired approach, where dedicated circuitry, typically in the format of one or more hardwired datapaths, is developed to implement each DSP function. Additional dedicated circuitry is then developed to transmit data between the various DSP functions. Typically, a hardwired approach offers the greatest performance, since circuitry may be optimized for one particular application. As a result, hardwired circuitry often minimizes memory requirements and circuit area, and maximizes circuit speed, for its given application.

The primary drawback to the hardwired approach, however, is the lack of flexibility resulting from the optimization for one particular application. A hardwired chip is typically designed and manufactured to work in one environment and to perform one specific set of functions. Upgrading or extending the functionality of a hardwired chip design often requires a complete redesign. Given that most of the cost in a chip is invested in its design, therefore, the hardwired approach can be relatively costly. Moreover, the hardwired approach typically has a relatively long development time, which can adversely affect a manufacturer's ability to respond quickly to consumer needs.

At the other end of the spectrum from the hardwired approach is the completely programmable (or software-based) approach, which, similar to a general purpose computer, attempts to support multiple applications by providing a relatively generic hardware platform that can be customized via software for use in different applications. Many software-based DSP architectures use very long instruction word (VLIW) processors, which provide extremely flexible and reconfigurable functionality for a wide variety of applications. Under this approach, the same integrated circuit device can be used to perform any number of functions merely by executing different software supplied to the device. Moreover, given that software is relatively easier and faster to design and troubleshoot than hardware, development is relatively faster and less expensive.

However, a purely software-based approach suffers from a number of drawbacks. First, using generic hardware typically requires compromises to be made to support multiple applications. As a result, many of the optimizations that might be made in a completely hardwired approach cannot be made for a software-based design. Consequently, the overall performance of a software-based design is often less optimal than a completely hardwired design.

Second, software-based designs typically require a very sophisticated compiler, a program used to convert human-readable program code into machine-readable instructions. Overall development costs and time thus increase due to the additional up-front effort and expense associated with developing the compiler.

Third, software-based designs also require a relatively sophisticated real time operating system that supports complicated scheduling of different tasks and threads. As a result, additional development efforts must be expended in this area as well, again increasing development costs and time. Furthermore, a complex multi-tasking operating system often introduces significant additional overhead, thereby further limiting performance and increasing memory requirements.

Therefore, a significant need exists for a manner of integrating DSP circuitry into an integrated circuit device to provide a better balance of development time, development expense, performance, flexibility, and upgradability.

SUMMARY OF THE INVENTION

The invention addresses these and other problems associated with the prior art by providing a circuit arrangement and method that utilize a distributed extensible processing architecture to allocate various DSP functions or operations between multiple processing cores disposed on an integrated circuit device. Each processing core includes one or more hardwired datapaths to provide one or more DSP operations. Moreover, each processing core includes a programmable controller that controls the operation of each hardwired datapath via a local computer program executed by the controller. Furthermore, the processing cores are coupled to one another over a communications bus to permit data to be passed between the cores and thereby permit multiple DSP operations to be performed on data supplied to the device.

Due to the unique combination of a programmable controller with one or more hardwired datapaths in a core, the benefits of both the fully hardwired and software-based approaches are realized, frequently without many of the attendant drawbacks associated with such conventional approaches. For example, as with a fully hardwired approach, the hardwired datapaths in each core may be optimized for performing dedicated functions with minimal memory and space requirements and/or with maximum performance. Furthermore, through the integration of such datapaths with a programmable controller, the operations of such datapaths may be customized for use in different applications, as with a software-based approach.

One important aspect of the above-described architecture is that it is distributed, with the processing circuitry in the various cores of an architected device sharing the overall workload of the device. Often, this results in greater performance than could otherwise be provided by a single, generic central processor as used in a software-based approach.

Another important aspect of the above-described architecture is that it is extensible. In particular, individual processing cores, customized via the local computer programs executed by the programmable controllers, may be assembled together into different configurations to support different applications or capabilities. The architecture thus provides a unique framework that can be used to speed the design and development of new devices as compared to previous hardwired approaches, e.g., via the reuse of existing core implementations in new designs. Moreover, often the individual cores may be separately designed and tested prior to assembling the cores into a device, thereby simplifying later development, verification and testing of the new devices. Furthermore, with processing capabilities distributed among multiple cores, the complexity and overhead associated with the underlying operating system code is significantly reduced as compared to centralized software-based approaches. Likewise, the compiler used to generate the local computer programs in the cores is often much less complex than would be required to compile the program code for a centralized processor implementation.

Therefore, consistent with one aspect of the invention, an integrated circuit device circuit arrangement is provided for processing multimedia data. The circuit arrangement includes a communications bus, and a plurality of processing cores coupled to one another over the communications bus. Each processing core includes a hardwired datapath configured to perform a predetermined digital signal processing (DSP) operation, and a programmable controller coupled to the hardwired datapath and configured to execute a local computer program to control the operation of the hardwired datapath to process data received by the processing core over the communications bus.

Consistent with another aspect of the invention, a method of processing multimedia data in an integrated circuit device is provided. The method includes distributing a plurality of digital signal processing (DSP) tasks over a communications bus to a plurality of processing cores disposed on an integrated circuit device, with each processing core including a programmable controller interfaced with a hardwired datapath configured to perform a predetermined DSP operation, and concurrently performing the DSP tasks distributed to the processing cores by executing a local computer program on the programmable controller in each processing core to customize the operation of the hardwired datapath interfaced therewith.

Consistent with a further aspect of the invention, a method is provided for designing an integrated circuit device circuit arrangement for processing multimedia data. The method includes selecting a plurality of digital signal processing (DSP) operations required to implement a desired multimedia functionality; assembling into a circuit arrangement a plurality of processing cores, with each processing core including at least one hardwired datapath configured to perform at least one of the plurality of DSP operations, and a programmable controller coupled to the hardwired datapath and configured to execute a local computer program to control the operation of the hardwired datapath to process data received by the processing core; logically connecting the plurality of processing cores to one another via a communications bus; and generating the local computer program to execute on the programmable controller in each processing core.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
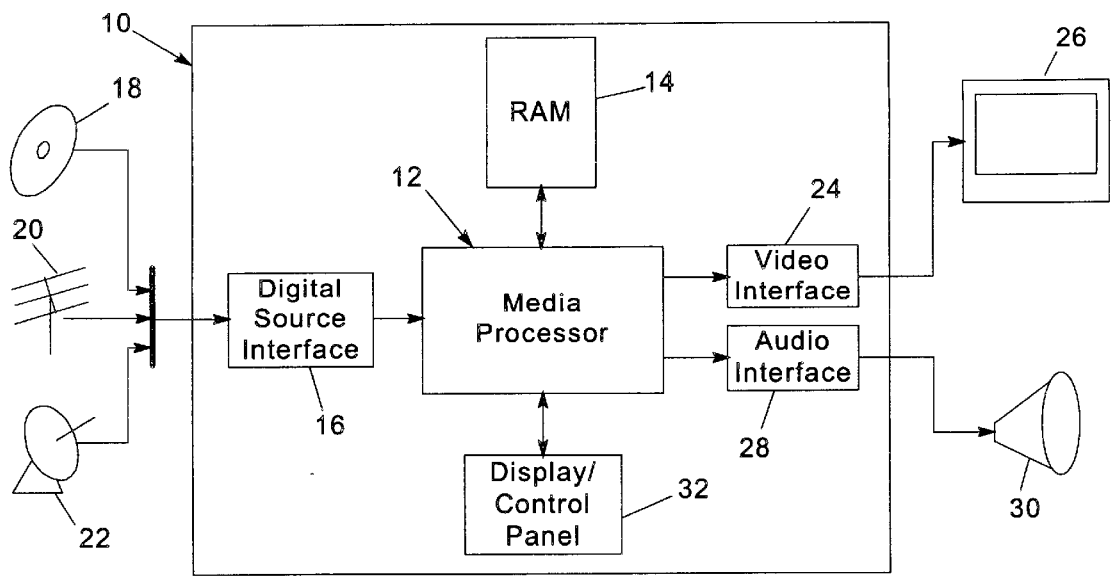
FIG. 1 is a block diagram of an audio/video component consistent with the invention.

Turning to the Drawings, wherein like numbers denote like parts throughout the several views, FIG. 1 illustrates a audio/video (A/V) component 10 consistent with the principles of the invention. Component 10 may be any of a number of components that process digital data and output audio and/or video information based thereon, including a personal or other computer, a television or television receiver, a direct broadcast satellite (DBS) receiver, an A/V receiver, a digital versatile disc (DVD) player or recorder, a cable set-top box, a video cassette recorder (VCR), a camcorder, etc.

Component 10 is under the control of a media processor 12 interfaced with a random access memory (RAM) 14 providing a portion of the working memory utilized by the processor in converting a digital data stream into audio and/or video information. A digital source interface 16 is shown receiving a digital data stream from one or more external sources, e.g., a DVD or CD 18, a digital television broadcast 20, and/or a direct broadcast satellite 22. It should be appreciated that digital source interface 16 may include any number of electronic and mechanical components suitable for retrieving a digital data stream and passing the stream to media processor 12, e.g., a laser pickup and turntable for DVD or CD information.

The digital data stream processed by media processor 12 is decoded and output as video and/or audio information. For video information, a video interface block 24 is used to interface with an external component, e.g., a television monitor 26. For audio information, such information is provided by media processor 12 to an audio interface block 28 which provides audio data for playback to a user, e.g., as represented by speaker 30.

It should be appreciated that A/V component 10 is merely representative of a wide class components suitable for processing digital multimedia information. Therefore, the invention should not be limited to the particular implementations disclosed herein.

The illustrated embodiments of the invention generally operate by distributing a plurality of digital signal processing (DSP) tasks to a plurality of processing cores configured to perform those tasks in an independent manner. The processing cores are disposed within a circuit arrangement, e.g., defining a media processor or other programmable integrated circuit device, and it should be appreciated that a wide variety of other programmable devices may implement the functionality of the cores consistent with the invention.

Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems and components utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Figure 2:
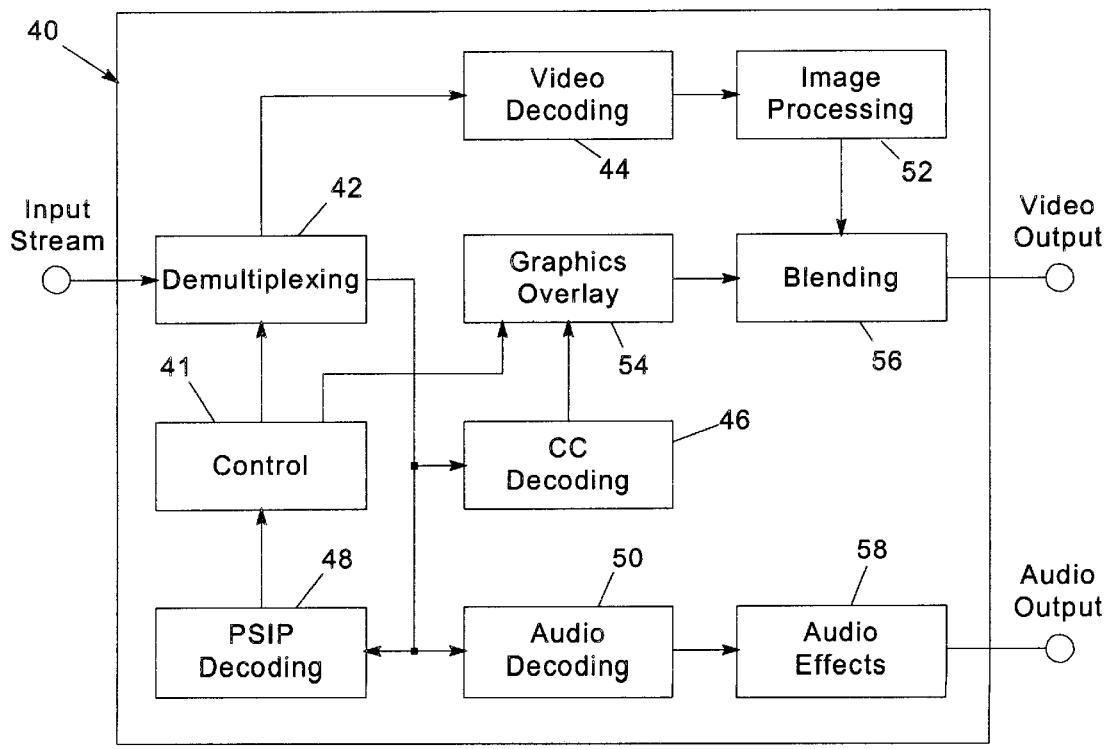
FIG. 2 is a block diagram of the principal DSP operations performed by a media processor consistent with the invention when implementing an advanced television systems committee (ATSC) receiver.

The processing cores may perform any of a number of known DSP operations to handle such tasks. For example, as shown in FIG. 2, a media processor 40 for use as a digital television receiver is illustrated. Media processor 40 is configured to comply with the Advanced Television System's Committee (ATSC) specification for digital television, which defines an MPEG-2 MP@HL video decoder, an AC3 audio decoder and a DVD-like demultiplexer as minimal components for any ATSC receiver. Additional components, such as graphics/onscreen display (OSD), high end post-filtering for decoded images, central applications, etc. may also be utilized. Also, all format decoding (AFD) must typically be addressed by an ATSC receiver.

Media processor 40 includes a control block 41 that executes a central application for controlling the overall operation of the media processor. A number of DSP tasks are then handled in blocks 42–58. Specifically, a digital input stream is fed into a demultiplexing block 42. The digital input stream is demultiplexed into several data streams, including a video data stream provided to video decoding block 44, a closed captioning data stream provided to closed captioning decoding block 46, a Program and System Information Package (PSIP) data stream provided to PSIP decoding block 48, and an audio data stream provided to an audio decoding block 50. Video decoding block 44 decodes the video information and passes the information to an image processing block 52 that performs functions such as filtering and format decoding. Any closed captioning information is decoded in block 46 and passed to a graphics overlay block 54 that overlays closed captioning text as desired, as well as any additional information such as on screen controls or displays under the control of the application executed by control block 41. The graphics overlay and video image data are blended in a blending block 56 to generate the video output signal. In addition, the audio data is decoded in block 50 and provided to block 58 to produce any audio effects, such as surround sound, reverb, etc. Block 58 then outputs an audio signal external to the processor.

It should be appreciated that a wide variety of additional DSP operations may be required in different applications, e.g., other filtering, decoding, image processing, effect processing, bit manipulation, stream parsing, and related operations.

Figure 3:
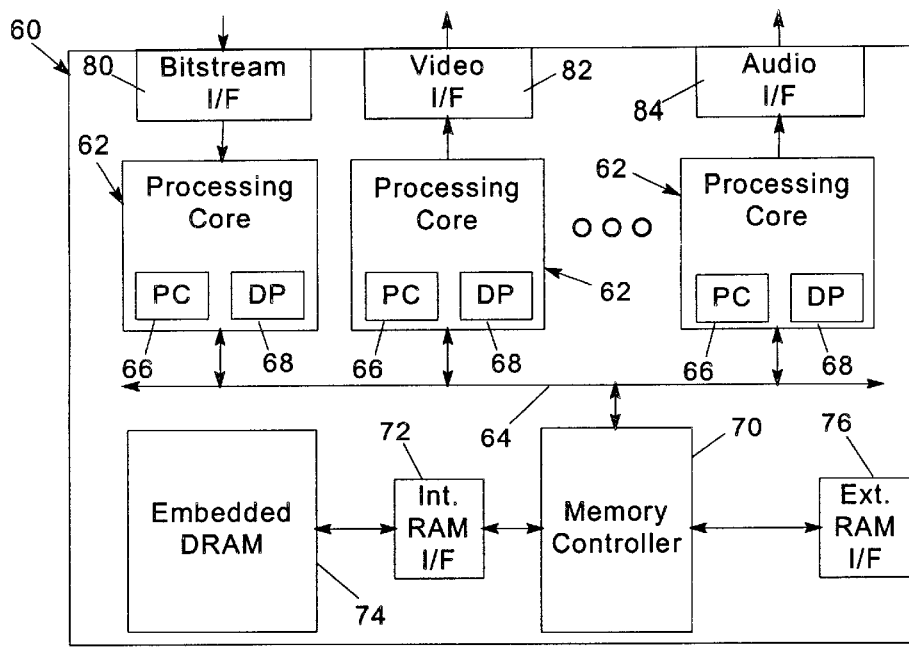
FIG. 3 is a block diagram of one implementation of the media processor in the audio/video component of FIG. 1.

As discussed above, to implement the various DSP operations necessary for a particular media application, such operations are distributed to multiple processing cores capable of operating concurrently with one another to handle the various DSP tasks. As shown in FIG. 3, for example, a media processor circuit arrangement 60 includes a plurality of processing cores 62 interfaced with one another over a communications bus 64. Each processing core includes a programmable controller (PC) 66 interfaced with one or more hardwired datapaths (DP's) 68. In addition, to support such processing cores, the cores may also be coupled to a memory subsystem, e.g., via a memory controller 70 interfaced with communications bus 64. As illustrated in FIG. 3, the memory subsystem may included embedded, or on board memory, e.g. embedded RAM 74 interfaced with memory controller 70 via an internal memory interface block 72. In addition, external memory may be supported, e.g., an external RAM 78 interfaced with memory controller 70 through an external memory interface block 76.

The configuration illustrated in FIG. 3 defines a distributed extensible processing (DXP) architecture for handling desired DSP tasks. To maximize the performance of each processing core in handling a particular task, the datapaths associated with each core are hardwired and optimized for handling a specific DSP operation. However, to simplify the media processor circuit arrangement design, as well as to facilitate code reuse, a programmable controller is utilized to control each hardwired datapath and provide an interface between cores, as well as to customize each datapath for handling particular tasks. It should be appreciated that the degree of functionality allocated between the datapaths and programmable controller in each core can vary from core to core as necessary to balance performance and extensibility for different applications.

As shown in FIG. 3, for example, different processing cores 62 are interfaced with a bitstream interface block 80, a video interface block 82 and an audio interface block 84. Other processing cores may not be coupled to any external interface. Moreover, other processing cores may be interfaced with other external components, e.g., a control panel/display.

In the illustrated embodiments, communications bus 64 is implemented using a packet-based bus protocol that supports communication between the cores as well as between individual cores and the memory subsystem, e.g., via a message passing protocol. While other communications bus implementations may be utilized in the alternative, one advantage of a message passing protocol is that cache coherence is facilitated between the various processing cores, since any internal cache within a given core need not be synchronized with cached information in other cores.

Figure 4:
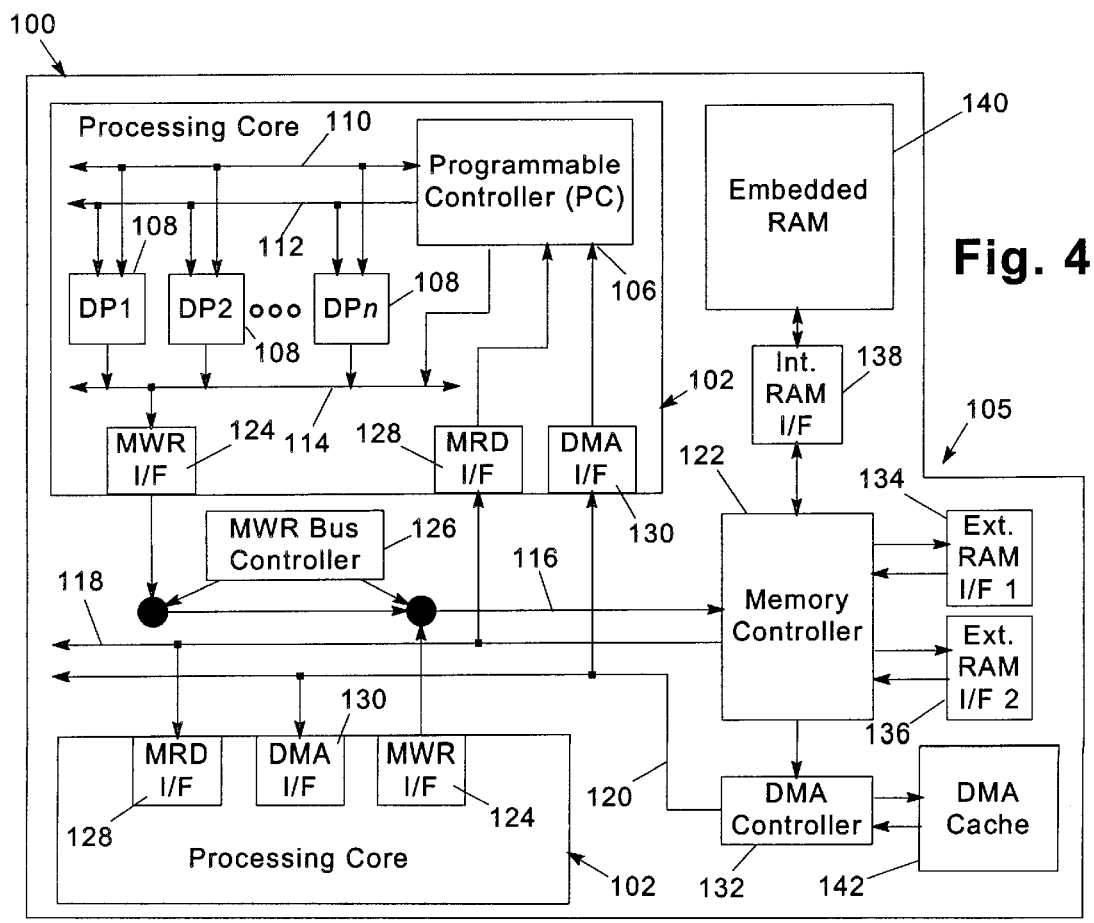
FIG. 4 is a block diagram of another implementation of the media processor in the audio/video component of FIG. 1.

FIG. 4 illustrates in greater detail another media processor circuit arrangement 100 defining a specific implementation of a media processor consistent with the invention. Specifically, media processor circuit arrangement 100 includes a plurality of processing cores 102 coupled via a communications bus 104 to a memory subsystem at 105. Each processing core includes a programmable controller 106 coupled to one or more hardwired datapaths 108. The programmable controller and hardwired datapaths are coupled to one another via a local bus (including separate data and address buses 110, 112). Output data from the core, e.g., messages to other cores and memory read and write requests, is provided via a bus 114.

As discussed above, the processing cores are connected to a bus 104 for data I/O to memory and between various cores. A number of bus architectures may be used consistent with the invention.

As one example, for digital television (DTV) applications, analysis has shown that typical memory bandwidth requirements are expected to range from about 600 MB/sec to about 1200 MB/sec. In order to support such high external memory requirements, it is envisioned that approximately 900 MB/sec to 1800 MB/sec internal bus bandwidth may be needed. Furthermore, it has been found that approximately 25% of memory bandwidth is typically occupied by WRITE operations and 75% is typically occupied by READ operations. Also, the READ bandwidth for various applications for DTV can be classified as predictable (where the access pattern is known and uniform) as opposed to random (where the access pattern is not predictable, e.g., a cache miss, motion compensation, etc.). It has been found that the distribution of predictable READ bandwidth to random READ bandwidth is typically about 40% and 35% of the total system bandwidth, respectively.

One manner of distributing the various types of bandwidth associated with DTV is shown in FIG. 4, where three separate buses provide data communications between the cores and memory, including a memory write (MWR) bus 116, a memory read (MRD) bus 118 and a direct memory access (DMA) bus 120. MWR bus 116 carries address and data packets from the cores to the memory subsystem, as well as address packets for READ requests.

In the illustrated implementation, the MWR bus 116 is a daisy chained implementation, coupling a memory controller 122 to various processing cores via MWR interface blocks 124 disposed in each core, and controlled by an MWR bus controller block 126. This is often a desirable architecture given that the MWR bus has multiple masters/drivers, and thus more flexible extensibility is supported given that the line runs between each node in the bus can be kept relatively short. A multi-drop bus may be used in the alternative for MWR bus 116, although greater care may be required to fulfill bus timing requirements in different designs.

MRD bus 118 is also coupled to memory controller 122, and random READ data is provided from the memory controller to the cores via MRD interface blocks 128 provided in each core. The DMA bus 120 carries predictable READ bandwidth from a DMA controller 132 under the control of memory controller 122. Each processing core receives the DMA data via a DMA interface block 130. In this implementation, buses 118 and 120 may be implemented as multi-drop buses, given that only one driver/master is typically required based upon the one-way data flow from the memory subsystem to the cores. Moreover, timing is not as great a concern, so excessively long line lengths to different cores in more complex designs can be broken up with intermediate repeater latches with negligible performance impact.

Selection of which of the MRD and DMA buses is used to return data to a core may be handled, for example, by the programmer of the local computer program in each core. For example, separate instructions may be defined in the instruction set for the programmable controller in each core to request that information be returned over a particular bus. In this manner, a programmer may be able to optimize bandwidth through software simulation and further "tweaking" of the resulting design.

Memory controller 122 is interfaced with an external memory via dual ports 134, 136. In addition, an internal memory, e.g., an embedded RAM 140 is interfaced with memory controller 122 via an internal RAM interface block 138. DMA controller 132 uses a unified stream cache 142 to keep latency on the DMA bus to a minimum and to provide better utilization of the external memory bandwidth. The DMA and MRD buses follow the same address/data packet format to allow for easy address decoding and broadcast features in each of the processing cores.

The DMA controller may also be configured to prefetch additional data into the stream cache in response to a DMA request, given that it is highly likely that a DMA request will be for a contiguous block of memory. To facilitate an interface between the cores and the DMA controller, it may also be desirable to utilize a separate request line from each core to the DMA controller to permit a core to initiate retrieval of another contiguous block of data over the DMA bus without having to resend a memory request over the MWR bus. Moreover, while stream cache 142 is illustrated as a unified cache, it should be appreciated that the stream cache may implement separate partitions to provide one or more dedicated channels to each core.

Figure 5:
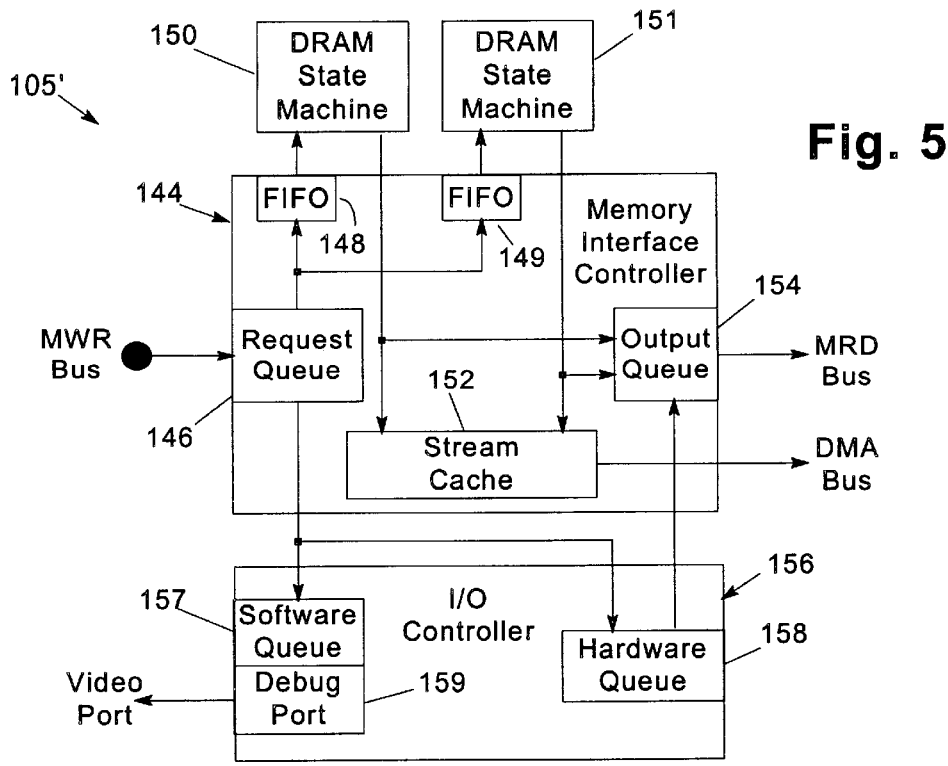
FIG. 5 is a block diagram of an alternate memory controller configuration to that of FIG. 4.

An alternate memory subsystem consistent with the invention is illustrated at 105' in FIG. 5. In this implementation, a memory interface controller 144 includes a request queue that receives packets of memory requests over the MWR bus and distributes the packets as appropriate between memory and input/output (I/O) partitions of the memory subsystem. In this implementation, a memory-mapped bus architecture is used, whereby different cores and memories are assigned different ranges of addresses in a common address space. Other bus architectures, e.g., channel-based architectures and the like, may be used in the alternative.

Packets for the memory partition are forwarded to one of two first-in first-out (FIFO) blocks 148, 149 that respectively forward the memory request packets to separate DRAM state machines 150, 151 that handle the memory interface with an internal and/or external DRAM memories (not shown). Each state machine 150, 151 outputs memory data to either a stream cache 152 or an output queue 154, which are respectively coupled to the DMA and MRD buses to output predictable and random read data, respectively, to the processing cores.

Packets for the I/O partition are forwarded to an I/O controller 156 which includes a software queue 157 for handling core-to-core operations, and a hardware queue 158. A debug port 159 may also provide a separate external video port to handle debugging functionality for the purpose of testing the operation of the media processor.

Core-to-core operations are handled by a requesting core forwarding a request packet to a memory space associated with software queue 157, which results in the software queue outputting the request back to the MRD bus specifying an address of the destination core. With other bus architectures, a peer-to-peer protocol could be used in the alternative to permit direct communication between any two cores without having to forward requests through the memory subsystem.

Figure 6:
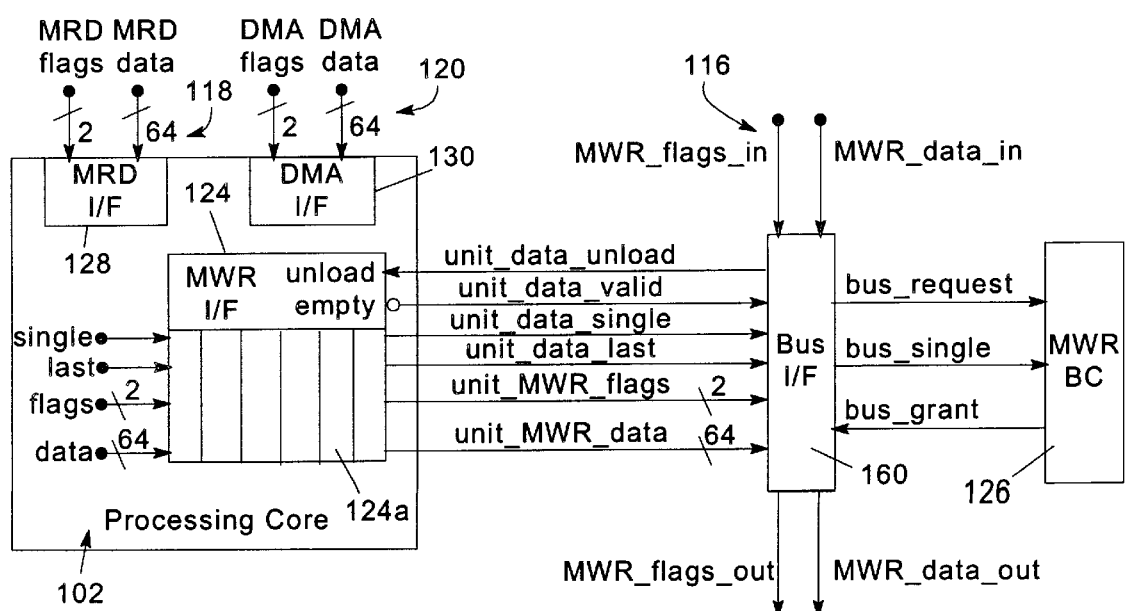
FIG. 6 is a block diagram illustrating one implementation of the bus architecture in the media processor of FIG. 4.

A wide variety of bus widths and protocols may be used consistent with the invention. For example, FIG. 6 illustrates one suitable bus implementation for coupling processing core 102 to MWR bus 116, MRD bus 118 and DMA bus 120. Each bus 116, 118, 120 is implemented with 64 bits of data and 2 bits of flag information. Memory requests and resulting data from read requests may be transmitted as bus packets varying in sizes of one or more 64-bit words. The first word in any packet is typically an address header, typically designating both the origination and destination nodes on the bus. A read packet typically consists of a single word which is the read address header. A write packet typically consists of a one word write address header (containing the target ID, address of the first data word, etc.), followed by one to eight data words or more. Any number of possible packet header formats may be used to coordinate the transfer of data between different nodes as will be readily appreciated by one of ordinary skill in the art.

Various status/control information may be supported by the flag bits to simplify decoding of bus packets by each core. One possible allocation is shown below in Table I:

TABLE I

Bus Flag Bit Assignment

| Value | Name | Description |
|---|---|---|
| 00 | INVALID | Invalid data bus cycle |
| 01 | READ_ADDR | Read address packet header on bus |
| 10 | WRITE_DATA | Write data word on bus |
| 11 | WRITE_ADDR | Write address packet header on bus |

With the allocation shown in Table I, it may be seen that a read operation (only valid on the MWR bus) will typically result in the READ_ADDR flag being set on the flag bits during transmission of the read address header. A write operation (valid for all buses) will typically result in the WRITE_ADDR flag being set for one cycle during transmission of the write address header, followed by the WRITE_DATA flag being set during transmission of all of the write data words being provided as the remainder of the packet.

Packets may be transferred over the MRD and DMA buses without any gaps. Packets may be transferred to the memory interface controller over the MWR bus without gaps unless the controller request queue is filled, whereby the memory controller must direct the MWR bus controller to stop granting MWR bus cycles.

In the implementation of FIG. 6, MWR bus controller 126 maintains two different round-robin arbitrators, one for single word packet requests only and the other for multiple word packet requests. Single word packet requests are prioritized over multiple word packets, except that a single core cannot be granted two single word packet requests without at least one multiple word packet request granted between the single word packet requests. A desirable effect of this particular arbitration protocol is that MWR bus bandwidth is distributed relatively evenly, and an upper bound is placed on the latency for multi-word packet requests.

Each core is coupled to MWR bus 116 via a generic MWR bus interface block 160. As shown in FIG. 6, due to the daisy-chain implementation of the MWR bus, block 160 receives the flag and data bits from a preceding node on the bus (designated MWR_flags_in and MWR_data_in) and outputs flag and data bits to a succeeding node on the bus (designated MWR_flags_out and MWR_data_out). MWR bus controller 126 receives from each bus interface block a bus_request signal indicating that control over the bus is requested. In addition, a bus_single signal is provided to indicate whether the outgoing request for the node is a single-word packet. Controller 126 asserts a bus_grant signal back to the interface block 160 whenever the node is granted control over the bus, based upon the arbitration rules discussed above.

Interface between core 102 and its respective bus interface 160 is provided via four control signals supplied concurrently with the outgoing data and flag bits for transmission over the MWR bus. In addition, as shown in FIG. 6, a request queue 124*a* may be provided in MWR interface block 124 to store request packets for transmission over the MWR bus. Queue 124*a* is 68 bits wide to support the 64 bits of data, 2 bits of flag, and two additional bits, denoted single and last. The single bit indicates when an outgoing packet is one word in length, and the last bit is used to designate the length of a multi-word packet. For example, the last bit may be used to denote length of a multi-word packet according to Table II below:

TABLE II

Packet Length Indication Using Last Signal

| Packet Length | When to Assert Last Signal |
|---|---|
| 1 word | don't care |
| 2 words | assert on first word of packet only |
| 3 words | assert on all words of packet |
| 4+ words | assert on last three words of packet |

MWR interface block 124 outputs request packets by passing the data and flag bits for each packet as denoted by unit_MWR_data and unit_MWR_flags. In addition, the single and last signals are output for each packet as denoted by unit_data_single and unit_data_last. Arbitration between interface 124 and interface 160 is provided by a pair of signals unit_data_unload and unit_data_valid.

Arbitration occurs as follows. When a packet is available in queue 124*a*, interface 124 places the first word of the packet on unit_MWR_data and asserts unit_MWR_flags, unit_data_last and unit_data_single as appropriate for the packet. In addition, unit_data_valid is asserted to indicate to interface 160 that a valid packet word is being asserted on the aforementioned lines. When interface 160 is granted control over the MWR bus, the packet word is read, and unit_data_unload is asserted back to interface 124 to indicate that the current packet word has been read and that the next word, and corresponding control signals, can be presented. Once queue 124a is empty, unit_data_valid is deasserted, indicating to interface 160 that no additional information need be transmitted from the core at this time. Control over the bus can then be released by interface 160.

It should be appreciated that the state machine circuitry to implement the above-described interface is well within the skill of the ordinary artisan. Moreover, it should be appreciated that the bus architecture described herein is but one manner of interfacing multiple cores with one another and with a shared memory. Other bus architectures may also be used in the alternative.

Figure 7:
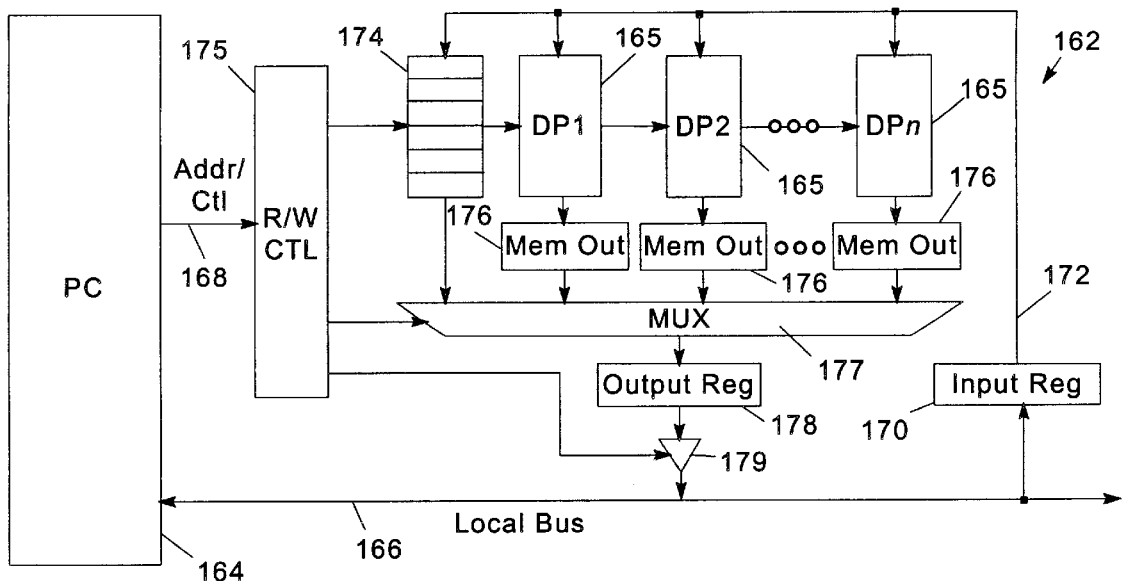
FIG. 7 is a block diagram illustrating the interface between the programmable controller and datapaths in each processing core in the media processor of FIG. 4.

Now turning to FIG. 7, one suitable manner of interfacing the programmable controller and various datapaths in each core together is shown, utilizing a coprocessor-type interface. A processing core 162 is illustrated as including a programmable controller (PC) 164 coupled to a plurality of datapaths 1. . . n 165 via a local data bus 166 and local address bus 168. Data provided by PC 164 over local data bus 166 is received by an input register 170 and forwarded to each datapath 165 over a data bus 172. The data in input register 170 is also forwarded to a set of unit registers 174 providing a local storage space for storing control and/or status information as may be needed to interface the programmable controller with the datapaths. Control over datapaths 165 and registers 174 is provided via a read/write (R/W) control block 175 that decodes address and control information provided over local address bus 168. Typically, each datapath 165 and register 174 is allocated one or more addresses in a local address space to permit programmable controller 164 to controllably write and/or read data to and/or from each datapath and register simply by supplying the address of the appropriate datapath/register over local address bus 168.

Each datapath 165 outputs to a memory out register 176, and each register outputs to a multiplexer 177 controlled by block 175. The set of registers 174 also outputs to multiplexer 177, so that the value stored in any of registers 174, 176 can be output to an output register 178 under the control of block 175. A three-state driver 179, also under control of block 175, selectively outputs the contents of output register 178 to local data bus 166 for transmission back to PC 164.

To control each datapath with a programmable controller, it may be desirable to implement specific instructions in the instruction set of the controller. For example, it may be desirable to implement register and datapath read (or load) and write (or store) instructions, with the various registers and datapaths allocated different addresses in the local address space. It may also be desirable to use separate instructions to handle data transfers with the registers and with the datapaths. Furthermore, multiple addressing modes, e.g., direct and indirect, may also be supported using different instructions. In one suitable implementation, for example, the interface may be implemented with eight instructions, including a write register direct instruction, a write register indirect instruction, a read register direct instruction, a read register indirect instruction, a write memory (datapath) direct instruction, a write memory (datapath) indirect instruction, a read memory (datapath) direct instruction, and a read memory (datapath) indirect instruction. It should be appreciated that a wide variety of instruction formats may be used, and which is used typically will depend upon the particular architecture of the programmable controller.

A number of processor architectures may be utilized in each programmable controller. For example, in the illustrated implementation, each programmable controller is a light-weight RISC processor with emphasis for conditional execution, bit-manipulation instructions and arithmetic/logical instructions. Each controller employs a two-way set associative cache with cache locking. The cache size of each controller may be configurable depending upon the functionality of the core. In each core, the programmable controller may be capable of controlling the hardwired datapaths over the local control bus by sending vector commands, configuration information, etc.

Given the relatively limited scope of each programmable controller, as well as the distributed nature of the architecture, it is believed that the complexity of each controller, as well as the operating system executed thereby, may be substantially reduced compared to a general purpose centralized controller architecture. For example, it is envisioned that a light-weight controller, e.g., of approximately 15,000 gates or less, may be utilized for each programmable controller.

Figure 8:
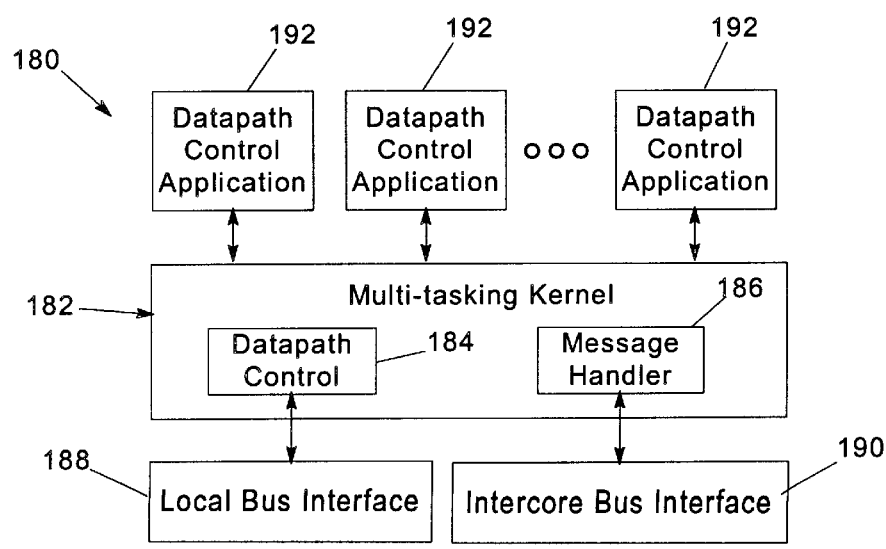
FIG. 8 is a block diagram of the software components executed by the programmable controller in each processing core in the media processor of FIG. 4.

Now turning to FIG. 8, a number of software components are executed by each programmable controller to handle the processing tasks for each processing core. These components are illustrated as executing on a programmable controller 180.

To facilitate the high-level programming language in rapid application development, a dedicated operating system/kernel 182 provides the system program code for controlling the datapaths in the core (illustrated by datapath component 184) and for handling inter-core and core-to-memory communication (represented by message handler component 186). The operating system/kernel in the illustrated embodiment is multi-tasking in nature, and may implement any other known operating system variations and techniques as appropriate. The datapath control component 184 relies on low-level interface routines that drive the local bus, as represented by component 188. Moreover, low-level routines are also provided in an inter-core (communications) bus interface component 190 utilized by message handler component 186.

Over this set of system codes execute one or more datapath control applications 192, representing the local computer programs executed by each programmable controller. The precise language and instruction set used for each datapath control application will vary depending upon the underlying operating system upon which each application executes.

While custom program code may be executed on each programmable controller, it may be seen that by utilizing a set of generic system code via an operating system/kernel in low-level support services, the design, development, verification and testing of the datapath control applications is greatly facilitated.

Figure 9:
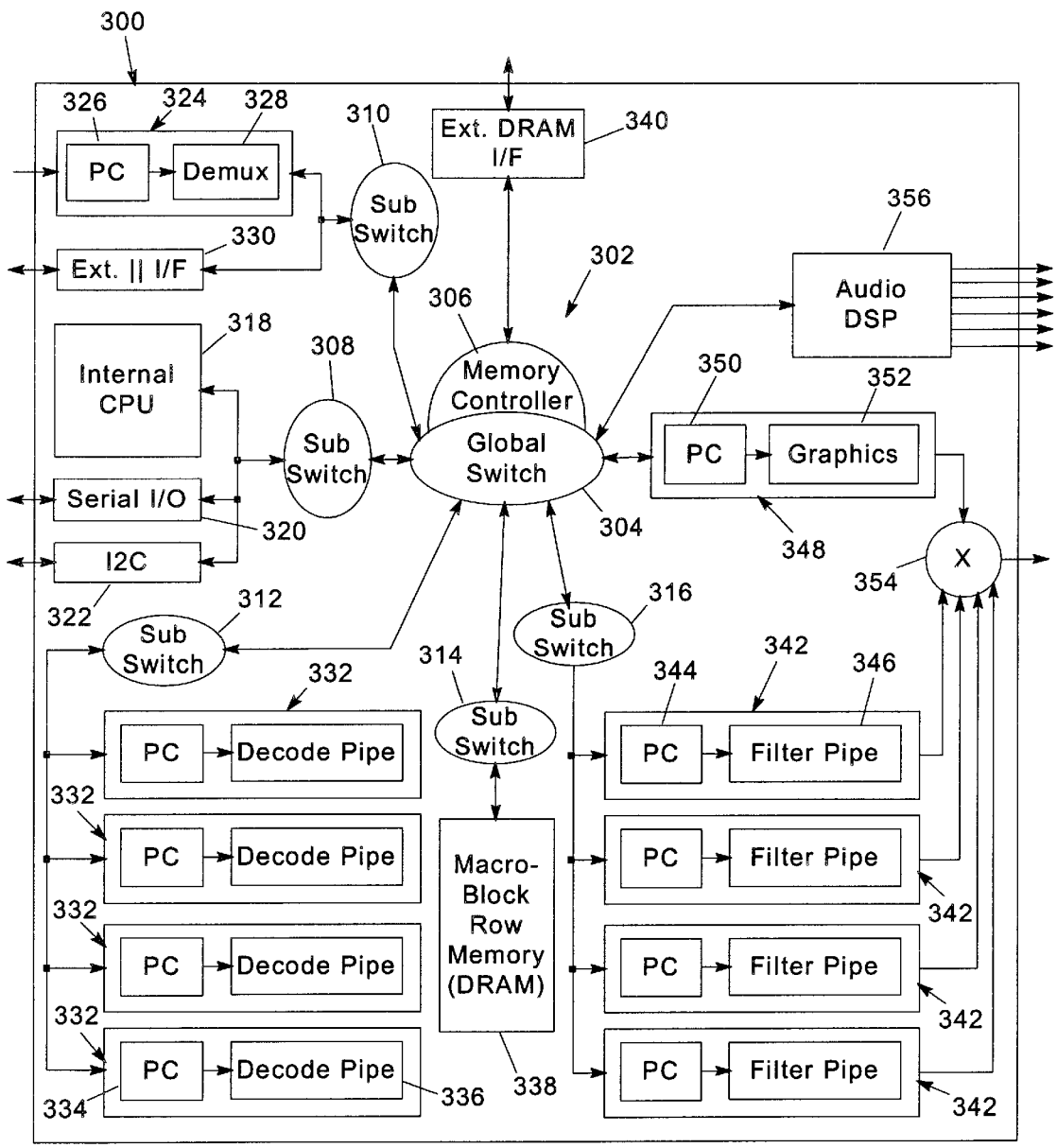
FIG. 9 is a block diagram of another implementation of the media processor in the audio/video component of FIG. 1.

Another specific implementation of a media processor consistent with the invention is illustrated in FIG. 9 as media processor circuit arrangement 300. In this implementation, a communications bus 302 is controlled via a global switch 304 under the control of a memory controller 306. The global switch works with a plurality of subswitches 308, 310, 312, 314 and 316, under the control of an internal CPU 318 interfaced to the communications bus via subswitch 308. The internal CPU operates as a scheduling processor that delivers DSP tasks to the various sub-units for processing, and also controls the flow of information through the global switch to the appropriate sub-units. The global switch operates to directly connect any two components coupled to the communications bus. In other implementations, it may be desirable to provide parallel transfer capability to simultaneously transmit information between multiple sources and multiple destinations.

Various components are coupled to communications bus 302 to support the various input/output interfaces necessary for media processor 300. For example, a serial input/output interface 320 is coupled to the communications interface via subswitch 308 to provide a serial interface for IR decoding, keyboard input/decoding, and/or any other general purpose I/O functionality. In addition, an internal device control (I2C) interface 322 coupled to subswitch 308 interfaces with any components for which is desirable to control with the media processor, e.g., a control panel/display, etc. The digital data stream input to the media processor is handled by a demultiplexing processing core 324 coupled to subswitch 310, including a programmable controller 326 interfaced with a demultiplexer datapath 328. Moreover, an external parallel interface coupled to subswitch 310 is provided via interface block 330.

To handle the decoding of the digital information input to the processor, a plurality of decoder processing cores 332 are coupled to bus 302 via subswitch 312, each including a programmable controller 334 interfaced with a decode pipeline datapath 336. It should be noted that, due to the extensibility and programmability of the various processing cores, each of processing cores 332 may be configured with identical hardware, but may execute different local computer programs to provide different decode functionality. Moreover, it should be appreciate that fewer or more processing cores 332 may be implemented to expand or restrict the functionality available to the processor.

Subswitch 314 interfaces the communications bus with an internal macroblock row memory represented at 338. An interface with external memory is also provided through an interface block 340 interfaced with memory controller 306.

Subswitch 316 interfaces the communications bus with a plurality of filter processing cores 342, each of which includes a programmable controller 344 interfaced with a filter pipeline datapath 346. Similar to the decode processing cores, each filter processing core includes identical hardware, but custom local software to customize each core to perform different filtering operations, e.g., vertical or horizontal decimation or interpolation.

Graphics overlay information is handled by a graphics processing core 348 including a programmable controller 350 interfaced with a graphics datapath 352. The outputs of each of processing cores 342 and 348 are supplied to a blender 354, from which video information is output from the media processor. In addition, as shown by audio DSP block 356, audio data may be decoded and output, e.g., in a AC3 format, among others. It should also be noted that it may not be desirable in some circumstances to utilize a programmable processing core to perform every function in the media processor. Specifically, audio DSP block 356 is shown as hardwired implementation, illustrating the concept of combining programmable processing cores with non-programmable cores.

Through the use of the above-described architecture, a unique, simplified method of designing an integrated circuit device circuit arrangement is also provided. In particular, the architecture may be utilized to instruct various circuit arrangements for different applications. To do so, a designer would first select the various digital signal processing operations required to implement the desired functionality of the circuit arrangement, and then assemble into an arrangement various processing cores, including the necessary number of hardwired datapaths and the generic programmable controller. Then, the designer would couple the processing cores to one another over a communications bus. Then, each processing core would be customized to perform its dedicated DSP operation by generating a local computer program to execute on the programmable controller in each processing core.

Through this architecture, it is relatively simple to extend the functionality of a given design merely by adding an additional processing core as needed. Furthermore, code reuse is facilitated as defined processing cores may be developed and verified independently, and reused in later applications.

Various modifications may be made to the illustrated embodiments without departing from the spirit and scope of the invention. Therefore, the invention lies in the claims hereinafter appended.

What is claimed is:

1. An integrated circuit device circuit arrangement for processing multimedia data, the circuit arrangement comprising:

(a) a communications bus; and (b) a plurality of processing cores coupled to one another over the communications bus, each processing core including:

(1) a hardwired datapath configured to perform a predetermined digital signal processing (DSP) operation; and (2) a programmable controller coupled to the hardwired datapath, the programmable controller configured to execute a local computer program to control the operation of the hardwired datapath to process data received by the processing core over the communications bus.

2. The circuit arrangement of claim 1, wherein the bus includes a global switch coupled intermediate the plurality of processing cores, the circuit arrangement further comprising a scheduling processor coupled to the global switch and configured to selectively couple at least two of the plurality of processing cores to one another to permit direct communication therebetween.

3. The circuit arrangement of claim 1, wherein the communications bus operates via a packet-based bus protocol.

4. The circuit arrangement of claim 3, further comprising a memory interface, coupled to the communications bus, and configured to transmit data between the plurality of processing cores and a shared memory.

5. The circuit arrangement of claim 4, wherein the communications bus includes first and second buses, the first bus configured to transmit packets from one of the plurality of processing cores to the memory interface; and the second bus configured to transmit packets from the memory interface to the plurality of processing cores.

6. The circuit arrangement of claim 5, wherein the second bus is configured to transmit random access read data packets from the memory interface to the plurality of processing cores, the circuit arrangement further comprising a third bus configured to transmit predictable read data packets from the memory interface to the plurality of processing cores.

7. The circuit arrangement of claim 6, wherein the memory interface further comprises a DMA controller coupled to the third bus.

8. The circuit arrangement of claim 6, wherein each processing core further includes first, second and third bus interfaces respectively configured to interface the processing core with the first, second and third buses.

9. The circuit arrangement of claim 5, wherein the first bus is configured to transmit read and write packets from the plurality of processing cores to the memory interface, each read packet including an address word, and each write packet including an address word and at least one data word.

10. The circuit arrangement of claim 5, wherein the second bus is configured to transmit write packets from the memory interface to the plurality of processing cores, each write packet including an address word and at least one data word.

11. The circuit arrangement of claim 5, wherein the first bus is daisy chained.

12. The circuit arrangement of claim 11, further comprising a bus controller coupled to the first bus, wherein each processing core and the memory interface has associated therewith a bus interface, with the bus interfaces coupled to one another in a daisy chain, and wherein the bus controller is configured to selectively grant control of the bus to one of the plurality of bus interfaces according to a predetermined arbitration algorithm.

13. The circuit arrangement of claim 12, wherein each processing core is configured to transmit both single and multiple word packets over the first bus, and wherein the bus controller is configured to grant priority to single word packets over multiple word packets.

14. The circuit arrangement of claim 13, wherein the bus controller is configured to grant priority to a multiple word packet from a first processing core relative to a single word packet from a second processing core if no multiple word packet has been transmitted over the first bus since the second processing core transmitted a single word packet.

15. The circuit arrangement of claim 13, wherein the first bus further comprises at least one flag indicating whether information currently transmitted on the bus is from a read or write packet, and whether the information is data or address information.

16. The circuit arrangement of claim 1, wherein each processing core further includes a local bus coupled between the programmable controller and the datapath.

17. The circuit arrangement of claim 1, wherein the programmable controller in each processing core is further configured to execute a local operating system.

18. The circuit arrangement of claim 17, wherein the local operating system executed by the programmable controller in each processing core is a multitasking operating system.

19. The circuit arrangement of claim 1, wherein the programmable controller and the hardwired datapath in each processing core are coupled to one another via a coprocessor interface.

20. The circuit arrangement of claim 1, wherein at least one of the plurality of processing cores includes a second hardwired datapath coupled to the programmable controller and configured to perform a second predetermined DSP operation for the processing core.

21. The circuit arrangement of claim 1, wherein at least one of the plurality of processing cores includes a local cache memory.

22. The circuit arrangement of claim 1, wherein the hardwired datapath in each processing core is configured to perform a DSP operation selected from the group consisting of a video decoding operation, an audio decoding operation, a filtering operation, an image processing operation, an audio effect processing operation, a text decoding operation, a graphics overlay operation, and combinations thereof.

23. An integrated circuit device comprising the circuit arrangement of claim 1.

24. An audio/video component comprising the circuit arrangement of claim 1.

25. The audio/video component of claim 18, wherein the audio/video component is selected from the group consisting of a set-top box, a digital television receiver, a television, a personal computer, a satellite receiver, a computer, a digital video disc (DVD) player, a DVD recorder, a video cassette recorder, and a camcorder.

26. A program product, comprising a hardware definition program that defines the circuit arrangement of claim 1; and a signal bearing media bearing the hardware definition program.

27. The program product of claim 26, wherein the signal bearing media includes at least one of a transmission type media and a recordable media.

28. An integrated circuit device circuit arrangement for processing multimedia data, the circuit arrangement comprising:
  (a) a communications bus; and
  (b) a plurality of processing cores coupled to one another over the communications bus, each processing core including a programmable controller interfaced with a hardwired datapath and configured to execute a local computer program to customize the operation of the hardwired datapath to perform a predetermined digital signal processing operation.

29. A method of processing multimedia data in an integrated circuit device, the method comprising:
  (a) distributing a plurality of digital signal processing (DSP) tasks over a communications bus to a plurality of processing cores disposed on an integrated circuit device, wherein each processing core includes a programmable controller interfaced with a hardwired datapath configured to perform a predetermined DSP operation; and
  (b) concurrently performing the DSP tasks distributed to the processing cores by executing a local computer program on the programmable controller in each processing core to customize the operation of the hardwired datapath interfaced therewith.

30. The method of claim 29, further comprising communicating a message between two of the plurality of processing cores over the communications bus using at least one packet.

31. The method of claim 29, further comprising communicating data between one of the processing cores and a shared memory over the communications bus using at least one packet.

32. The method of claim 31, wherein the communications bus includes a daisy chained bus for transmitting request packets from the plurality of processing cores to the shared memory.

33. The method of claim 32, wherein each processing core is configured to transmit both single and multiple word packets to the shared memory over the daisy chained bus, the method further comprising granting priority over the daisy chained bus to single word packets over multiple word packets.

34. The method of claim 33, further comprising granting priority to a multiple word packet from a first processing core relative to a single word packet from a second processing core if no multiple word packet has been transmitted over the daisy chained bus since the second processing core transmitted a single word packet.

35. The method of claim 29, wherein executing the local computer program on the programmable controller in each processing core includes accessing a local operating system resident in the programmable controller.

36. The method of claim 29, wherein at least one of the plurality of processing cores includes a second hardwired datapath coupled to the programmable controller.

37. The method of claim 29, wherein the hardwired datapath in each processing core is configured to perform a DSP operation selected from the group consisting of a video decoding operation, an audio decoding operation, a filtering operation, an image processing operation, an audio effect processing operation, a text decoding operation, a graphics overlay operation, and combinations thereof.

38. A method of designing an integrated circuit device circuit arrangement for processing multimedia data, the method comprising:

(a) selecting a plurality of digital signal processing (DSP) operations required to implement a desired multimedia functionality;

(b) assembling into a circuit arrangement a plurality of processing cores, each processing core including:

(1) at least one hardwired datapath configured to perform at least one of the plurality of DSP operations; and (2) a programmable controller coupled to the hardwired datapath, the programmable controller configured to execute a local computer program to control the operation of the hardwired datapath to process data received by the processing core;

(c) logically connecting the plurality of processing cores to one another via a communications bus; and (d) generating the local computer program to execute on the programmable controller in each processing core.

39. The method of claim 38, wherein logically connecting the plurality of processing cores to one another via the communications bus includes coupling the processing cores to a daisy chained bus configured to transmit request packets from the plurality of processing cores to a shared memory.

40. An integrated circuit device circuit arrangement designed by the method of claim 38.

* * * * *